(12) United States Patent
Takahashi et al.

(10) Patent No.: US 10,241,318 B2
(45) Date of Patent: Mar. 26, 2019

(54) TELESCOPING SIGHT WITH INTEROPERATING DUAL COURSE AND FINE CONTROLS FOR FOCUS, AND METHODS OF ASSEMBLY AND OPERATION THEREOF

(71) Applicant: SIGHTRON, INC., Youngsville, NC (US)

(72) Inventors: Kazuyoshi Takahashi, Raleigh, NC (US); Shuji Moriai, Youngsville, NC (US); Takayoshi Narukawa, Youngsville, NC (US)

(73) Assignee: SIGHTRON, INC., Youngsville, NC (US)

( * ) Notice: Subject to any disclaimer, the term of this patent is extended or adjusted under 35 U.S.C. 154(b) by 795 days.

(21) Appl. No.: 14/705,275

(22) Filed: May 6, 2015

(65) Prior Publication Data

US 2015/0323778 A1    Nov. 12, 2015

Related U.S. Application Data

(60) Provisional application No. 61/992,013, filed on May 12, 2014.

(51) Int. Cl.
*G01B 21/08* (2006.01)
*G02B 23/14* (2006.01)
*G02B 23/00* (2006.01)

(52) U.S. Cl.
CPC ........... *G02B 23/14* (2013.01); *G02B 23/145* (2013.01)

(58) Field of Classification Search
CPC .. G02B 21/24; G02B 21/241; G02B 21/0008;
G02B 21/26; G02B 21/00; G02B 7/06;
G02B 7/023; G02B 7/04; G02B 7/10;
G02B 7/32; G02B 7/36; G02B 15/04;
G02B 15/14; G02B 17/14; G02B 21/53;
G02B 21/242; G02B 23/00; G02B 23/14;
G02B 23/16; G02B 23/18; G02B 23/145;
G02B 27/0075; G02B 27/06; G02B
27/32; G02B 27/36; G05G 1/10; G05G
5/12;

(Continued)

(56) References Cited

U.S. PATENT DOCUMENTS 2,782,683 A    2/1957 Walker
2,811,894 A   11/1957 Braker
(Continued)

FOREIGN PATENT DOCUMENTS

DE    926 815 C     5/1955
EP    0 215 162 A1  8/1985
(Continued)

OTHER PUBLICATIONS

"Brunel SP105M Metallurgical", Brunel Microscopes Ltd., 2 pp., last accessed May 4, 2015, http://www.brunelmicroscopes.co.uk/metallurgical-microscope.html.
(Continued)

*Primary Examiner* — Mustak Choudhury
(74) *Attorney, Agent, or Firm* — Arent Fox LLP

(57) ABSTRACT

A telescoping sight having a sight housing, a moveable lens within the sight housing, a course focus adjustment control being operable to move the moveable lens via a spiral track, and a fine focus adjustment control, the fine focus adjustment control being interoperable with the spiral track.

13 Claims, 7 Drawing Sheets

(58) Field of Classification Search
CPC ... G03B 5/00; G03B 5/02; G03B 5/04; G03B 5/06; G03B 5/08; F41G 1/00; F41G 1/38; F41G 1/40; F41G 1/48; F41G 3/06; F41G 3/08; H04N 5/2254
USPC ....... 359/383, 384, 392, 399, 405, 410, 416, 359/418, 422, 424, 425, 427, 646, 359/696–699, 823; 42/119, 120, 122, 125
See application file for complete search history.

(56) References Cited

U.S. PATENT DOCUMENTS

| | | | |
|---|---|---|---|
| 3,028,792 A | 4/1962 | Krajowsky et al. | |
| 3,106,125 A | 10/1963 | Martin et al. | |
| 3,492,059 A * | 1/1970 | Shio Megumu | G02B 21/242 359/383 |
| 4,018,520 A | 4/1977 | Aste | |
| 4,080,043 A | 3/1978 | Altenheiner et al. | |
| 4,083,256 A | 4/1978 | Shio | |
| 4,247,161 A | 1/1981 | Unertl, Jr. | |
| 4,445,758 A | 5/1984 | Emmel | |
| 4,616,517 A | 10/1986 | Esmay | |
| 4,643,542 A | 2/1987 | Gibson | |
| 4,955,702 A | 9/1990 | Nakamura | |
| 4,998,811 A | 3/1991 | Basta | |
| 5,020,892 A | 6/1991 | Glover et al. | |
| 5,113,261 A | 5/1992 | Morisawa | |
| 5,121,655 A | 6/1992 | Toshimitsu | |
| 5,499,456 A | 3/1996 | Tomita | |
| 5,630,771 A | 5/1997 | Weber et al. | |
| 5,689,366 A | 11/1997 | Sakamoto | |
| 6,351,907 B1 | 3/2002 | Otteman | |
| 6,598,332 B1 | 7/2003 | Jibiki | |
| 7,031,056 B2 | 4/2006 | Peter et al. | |
| 8,104,217 B2 | 1/2012 | Huber | |
| 8,482,852 B2 | 7/2013 | Schadwinkel et al. | |
| 2004/0169918 A1* | 9/2004 | Luthardt | G02B 7/04 359/425 |
| 2013/0276345 A1 | 10/2013 | Hamilton | |

FOREIGN PATENT DOCUMENTS

| | | |
|---|---|---|
| GB | 9059 A | 2/1915 |
| GB | 421030 A | 12/1934 |
| GB | 1073520 A | 6/1967 |
| JP | 2008-114786 A | 5/2008 |

OTHER PUBLICATIONS

"Celestron PentaviewTM LCD Digital Microscope w/ Touchscreen", Focus Scientific, last accessed May 4, 2015, 2 pp., https://focusscientific.com/osCommerce/catalog/product_info.phpfmanufacturers_id/10/products_id/727.

"NightHawk Spotting Scopes", NightHawk, last accessed May 4, 2015, 2 pp., http://swfa.com/Swift-NightHawk-Spotting-Scopes-C492.aspx.

Gaylord, "How does the power of a scope affect accuracy?" Airgun Academy, Dec. 13, 2013, 22 pp., http://www.pyramydaircom/blog/2013/12/how-does-the-power-of-a-scope-affect-accuracy/.

Overney et al., "The Leitz Orthoplan and Ortholux II Research Microscopes", 4th Edition, Apr. 2011, 20 pp.

European Search Report and Written Opinion issued in European Patent Application No. 15792564.5 dated Nov. 29, 2017.

* cited by examiner

# TELESCOPING SIGHT WITH INTEROPERATING DUAL COURSE AND FINE CONTROLS FOR FOCUS, AND METHODS OF ASSEMBLY AND OPERATION THEREOF

This application claims priority to U.S. Provisional Application No. 61/992,013, filed May 12, 2014, entitled "TELESCOPING SIGHT WITH INTEROPERATING DUAL COURSE AND FINE CONTROLS FOR FOCUS, AND METHODS OF ASSEMBLY AND OPERATION THEREOF," which is hereby expressly incorporated in its entirety by reference herein.

FIELD OF THE INVENTION

Aspects of the invention relate to a telescoping sight having dual course and fine controls for focus, and methods of assembly and operation thereof.

BACKGROUND OF THE INVENTION

Telescopic sights for rifles typically include eyepiece and objective lenses positioned at opposite ends of a tubular housing. Conventional variable optical power telescopic sights also include an erector lens positioned medially of the eyepiece and objective lenses movable along a central longitudinal axis of the housing for adjustment of the optical power.

In these sights, an image focus adjustment compensating for variations in the distance from the marksman to the target is typically accomplished by longitudinal movement of the objective lens. One prevalent image focus adjustment implementation uses a threaded mounting ring that is coupled to the housing for rotation about the objective end of the housing. The marksman rotates the mounting ring, to adjust the position of a focusing element of the objective lens along the longitudinal axis of the housing.

A technique for varying the optical power of a telescopic sight is described in U.S. Pat. No. 6,351,907 to Otteman. This telescopic sight has a rotatable cam hub including a drive face and a spiral cam track formed in the drive face around an axis of rotation. An actuator slide of the adjustment mechanism is slidably mounted to a housing of the telescopic rifle sight for movement along a longitudinal axis of the housing. The actuator slide includes a cam follower that is operably engaged in the spiral cam track so that the actuator slide moves generally along the longitudinal axis in response to rotation of the cam hub to changing a setting of the adjustment mechanism. The actuator slide is operatively connected to a movable optical element positioned within the housing of the telescopic rifle sight to drive the optical element in response to rotation of the cam hub. The rate of linear movement of the optical element relative to the rate of rotation of the cam hub is controlled by the shape and arcuate angle of the spiral cam track. A spring biases the actuator slide relative to the housing to prevent rifle recoil from inducing changes to the setting of the adjustment mechanism However, such telescopic sights of do not allow for both course and fine focus adjustment.

SUMMARY

Aspects of the present invention provide a telescoping sight, comprising a sight housing; a moveable lens within the sight housing; a course focus adjustment control being operable to move the moveable lens via a spiral track; and a fine focus adjustment control, the fine focus adjustment control being interoperable with the spiral track.

Aspects of the present invention also provide a method for focusing a telescoping sight, the telescoping sight including a sight housing; a moveable lens within the sight housing; a course focus adjustment control being operable to move the moveable lens via a spiral track; a cam mechanism having a feature receivable within the spiral track, and a fine focus adjustment control, the fine focus adjustment control being interoperable with the spiral track via a reduced gear feature, the method comprising rotational motion of the course focus adjustment producing rotation of the spiral track; rotation of the spiral track causing movement of the moveable lens via travel of the feature of the cam mechanism receivable about the spiral track; and rotation of the fine focus adjustment control causing reduced gear ratio movement of the moveable lens via travel of the feature of the cam mechanism about the spiral track.

Aspects of the present invention also provide a control system for a telescoping sight, the telescoping sight having a sight housing a moveable lens within the sight housing, the control system comprising: a course focus adjustment control being operable to move the moveable lens via a spiral track; and a fine focus adjustment control, the fine focus adjustment control being interoperable with the spiral track via a reduced gear ratio mechanism.

Additional advantages and novel features relating to aspects of the present invention will be set forth in part in the description that follows, and in part will become more apparent to those skilled in the art upon examination of the following or upon learning by practice thereof.

DETAILED DESCRIPTION

Aspects of the present invention provide for a telescoping sight, such as may be usable as a rifle sight, having a housing and at least two attached thumbwheel focal adjustment knobs or other similarly functioning mechanisms, a first thumbwheel or other similarly functioning mechanism for providing course focal adjustment control (also interchangeably referred to herein as a "course adjustment knob") and a second thumbwheel or other similarly functioning mechanism (also interchangeably referred to herein as a "fine adjustment knob") for providing fine focal adjustment control.

Figure 1A:
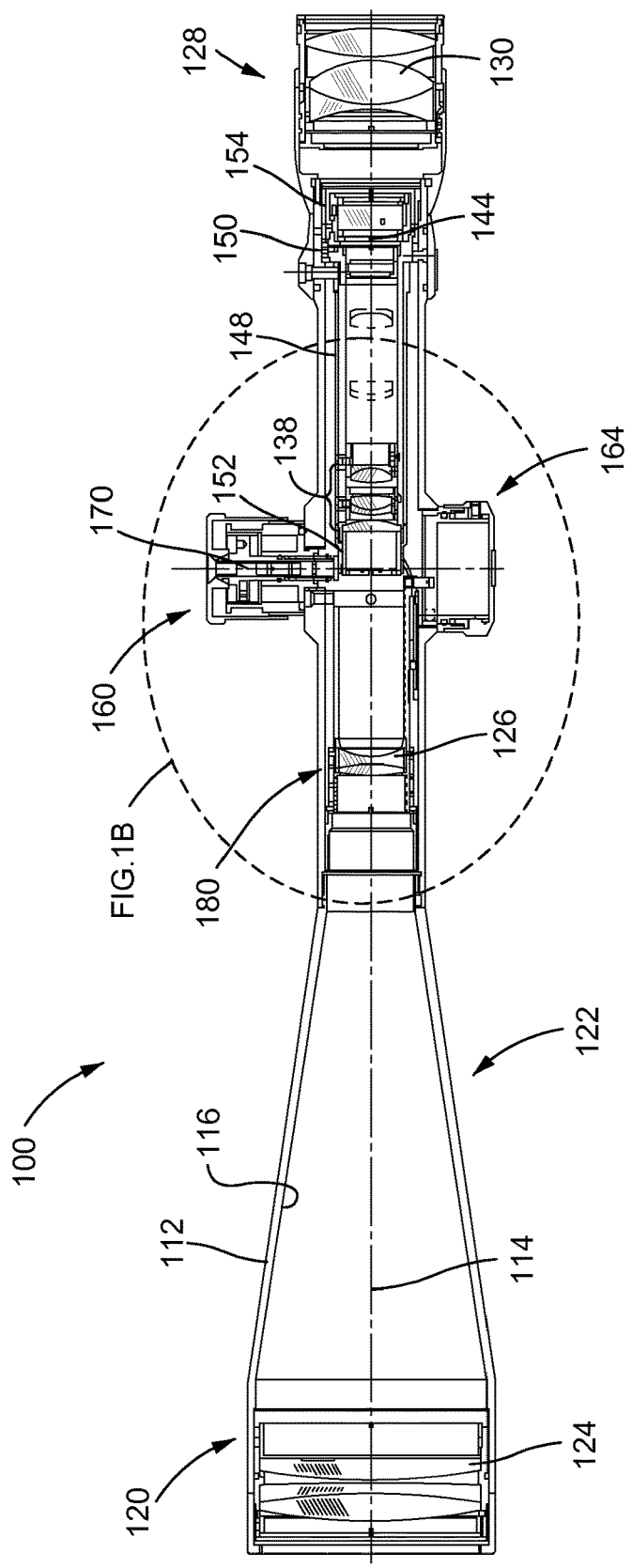
FIG. 1A is a sectional view of a telescopic sight in accordance with aspects of the present invention.

FIG. 1a is a sectional view of an example telescopic sight 100. The telescopic sight 100 may include an elongate tubular housing 112 having a central longitudinal axis 114 and an inner surface 116, and holding within its interior an optical system. The optical system includes, at an objective end 120 of housing 112, an objective lens system 122 having a fixed objective portion 124 and a movable objective portion/focus lens 126 and, at an eyepiece end 128 of housing 112, an eyepiece 130. An erector 138 and a reticle 144 are positioned between objective lens system 122 and eyepiece 130. A pivot tube 148 includes a pivot end 150 and a distal end 152. Pivot end 150 is mounted in a pivot socket 154 formed on the inner surface 116 of housing 112 for pivotal movement of pivot tube 148 within housing 112. Pivot tube 148 supports erector 138 to allow lateral movement of erector 138 within the interior of housing 112. A windage control device 160, a holdover control device 162 (FIG. 1c), and a focus control device 164 (also referred herein as a "control system") are all rotatably mounted to housing 112 for adjustment of the optical system, as described further below. Rotation of windage and holdover control devices 160 and 162 may cause threaded cores 170 to impart pivotal movement to pivot tube 148 to adjust the aim of telescopic sight 100. Housing 112 and most other non-optical components of telescopic sight 100 may be formed, for example, of aluminum alloy or other high strength, lightweight material. Lenses and other elements of the optical system may be formed of optical quality glass, plastic, or another suitable material. Details of an example windage control device may be found in U.S. Pat. No. 6,351,907 to Otteman, which is expressly incorporated by reference herein.

Figure 1B:
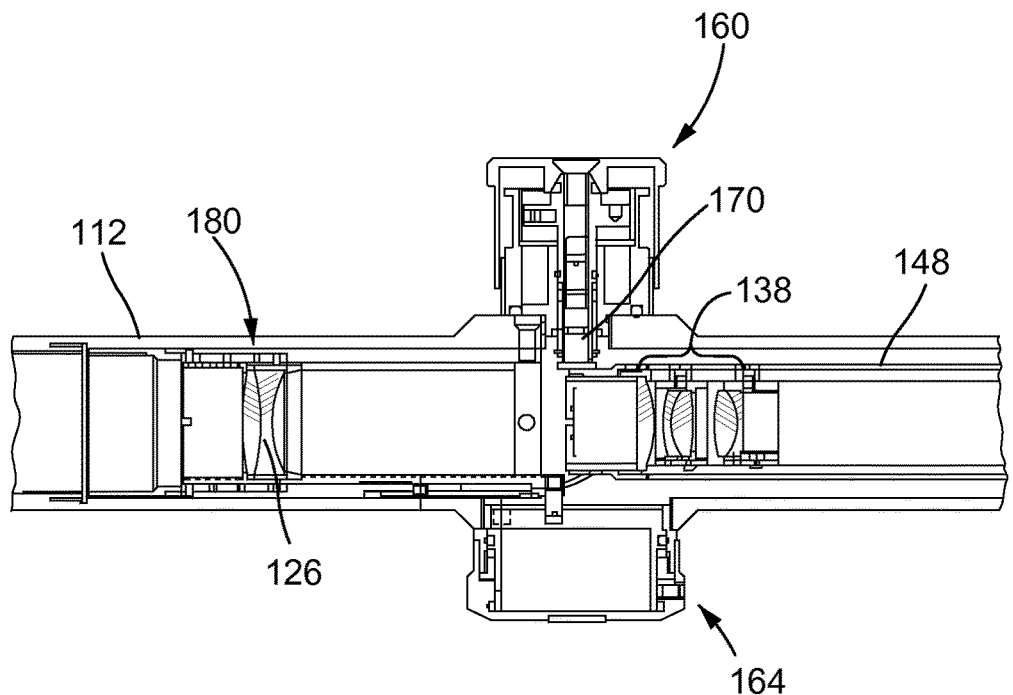
FIG. 1B is an enlarged sectional view of the telescopic sight showing detail of area 1B-1B of FIG. 1A.
Figure 1C:
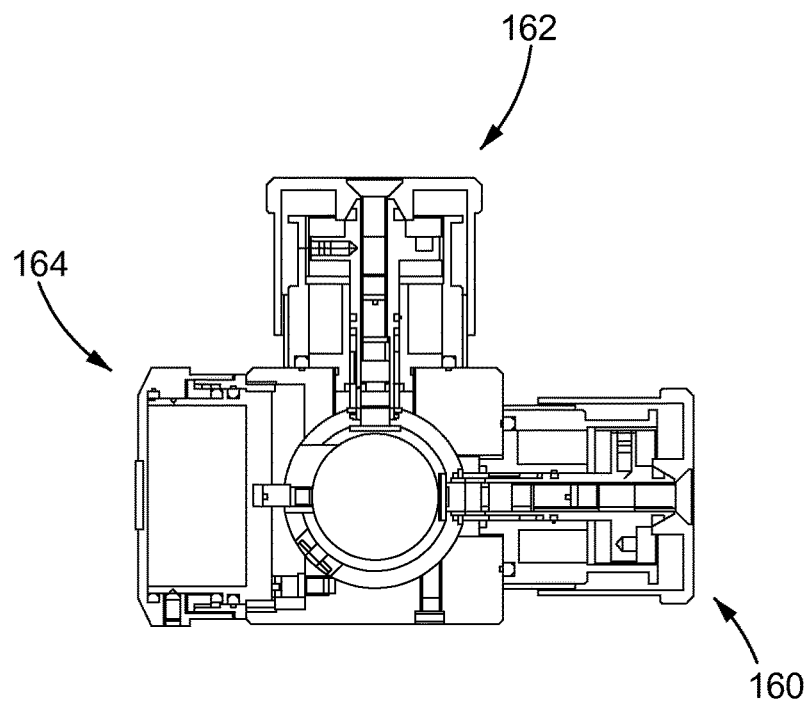
FIG. 1C is a side view of the enlarged sectional view of FIG. 1B.

FIG. 1b is an enlarged sectional view of area 1b-1b of FIG. 1 showing details of movable objective portion/focus lens 126 and focus control device 164. The telescopic sight 100 includes a mechanical displacement mechanism 180. An example manner in which the mechanical displacement mechanism 180 is described in U.S. Pat. No. 6,531,907 to Otteman, which is hereby incorporated by reference herein. The movable objective lens portion 126 is positioned within housing 112 medially of fixed objective lens portion 124 and pivot tube 148. Mechanical displacement mechanism 180 may include a carrier bushing fixedly mounted within housing 112 and secured in place by a lock nut. A ridge within housing 112 may facilitate accurate and secure mounting of carrier bushing. A sliding lens carrier 100 may be slidably mounted within carrier bushing. The sliding lens carrier 100 may support movable objective lens portion 126 for movement along longitudinal axis 114 of housing 112. A linkage may be rigidly connected at one end to sliding lens carrier 100 and at its other end to focus control device 164. Example details of the structural arrangement may be found in U.S. Pat. No. 6,531,907 to Otteman, which is hereby incorporated in its entirety by reference herein.

Figure 2:
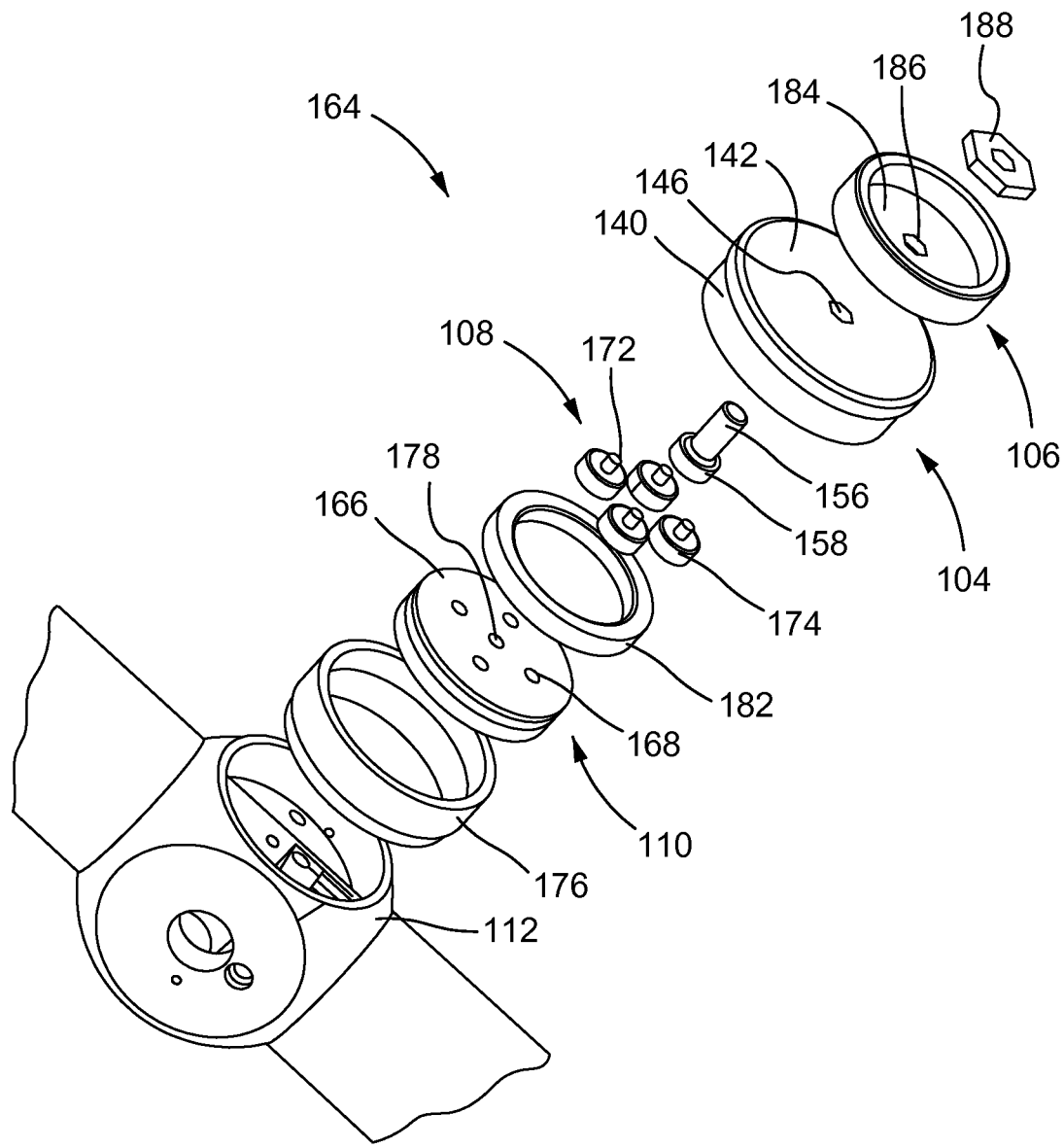
FIG. 2 is a partially exploded view of the telescopic sight of FIG. 1 showing details of a course focus adjustment control and a fine focus adjustment control of the telescopic sight.
Figure 3:
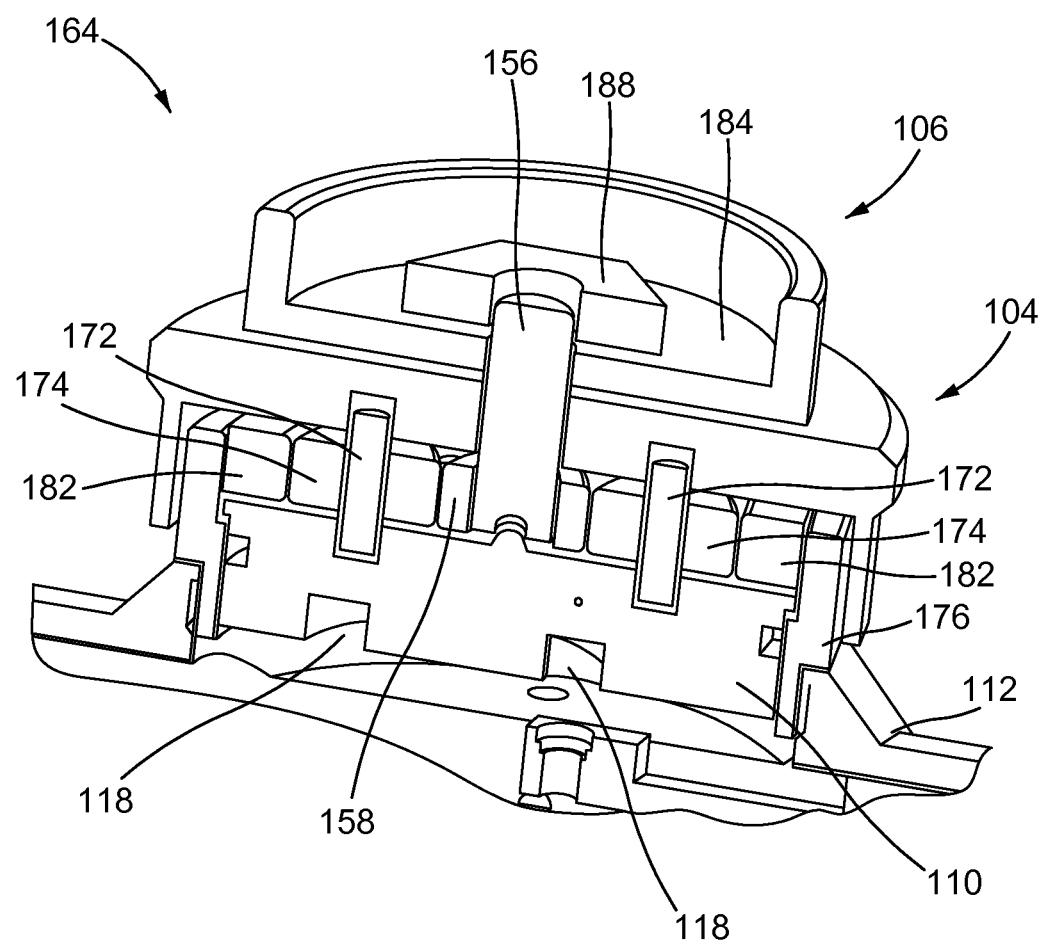
FIG. 3 is an enlarged sectional view of the course and fine focus adjustment controls of the telescopic sight of FIG. 1A.
Figure 4:
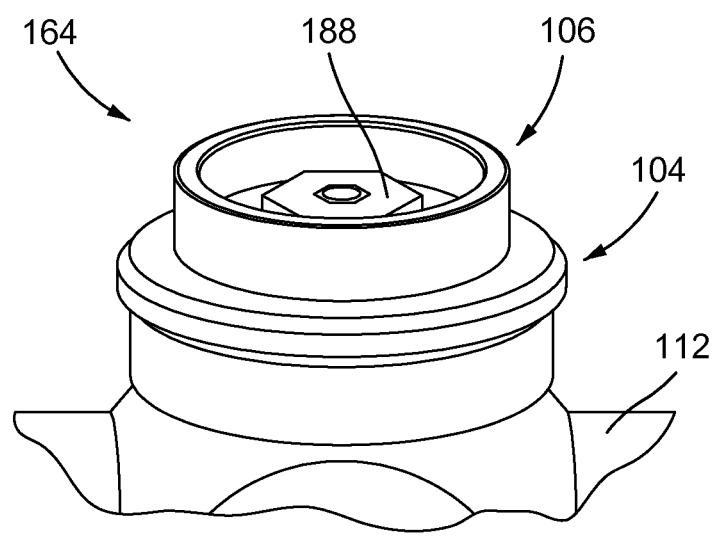
FIG. 4 is a perspective side view of the course and fine focus adjustment controls of the telescopic sight of FIG. 1A.

FIG. 2 is a partially exploded view showing components of focus control device 164. FIG. 3 is an enlarged sectional view of the course and fine focus adjustment controls. FIG. 4 is a perspective side view of the course and fine focus adjustment controls. As noted above, the telescopic sight 100 may include the housing 112 and at least two attached thumbwheel focal adjustment knobs or other similarly functioning mechanisms, such as a first thumbwheel 1044 for providing course focal adjustment control (also interchangeably referred to herein as a "course adjustment knob") and a second thumbwheel 106 (also interchangeably referred to herein as a "fine adjustment knob") for providing fine focal adjustment. In one variation, the two thumbwheels 104, 106 interoperate via a planetary gear system 108. See, e.g., FIG. 2 for exploded view of various components of an example such system, FIG. 3 for a cutaway view of the assembled system of FIG. 2, and FIG. 4 for a perspective view of the assembled system of FIGS. 2 and 3.

As noted above, the telescoping sight 100 may include a focus lens 126 located within the housing 112, the focus lens 126 being axially aligned and moveable relatively to the fixed lens 124, such that focus may be adjusted in the axial direction by adjusting the focal length between the focus lens 126 and the fixed lens 124. In one variation, the first thumbwheel 104 is operably coupled to the mechanical displacement mechanism 180 to provide movement of the focus lens 126 relative to at least a fixed lens 124 in the axial alignment direction of the lenses, in order to adjust the focal length between the two lenses, thereby varying focus.

In one variation, mechanical displacement of the focus lens 126 is provided by the first thumbwheel 104 via rotational motion of the first thumbwheel 104. The first thumbwheel's rotational motion may cause such displacement by a variety of features and methods. In one example variation, the first thumbwheel 104 is generally disk-shaped and is connected to or otherwise interoperable with a focus cam 110. The focus cam 110 includes a spiral race or track 118 on a face 132 of the focus cam 110 that is oriented internally to the telescoping sight (see, e.g., spiral track 118 of FIG. 5 and wheel with spiral track 118 operable with a pin 134 to move a rod 136 with attached lens, as shown in FIG. 6).

Figure 5:
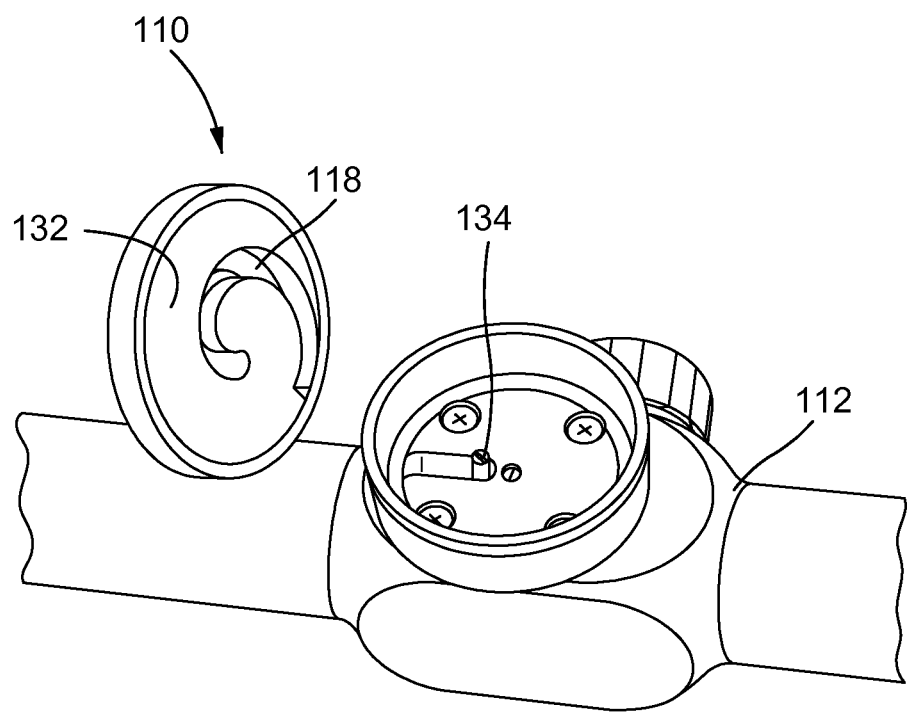
FIG. 5 is a perspective view of an underside of an example focus cam and a portion of a housing of the telescopic sight of FIG. 1A.
Figure 6:
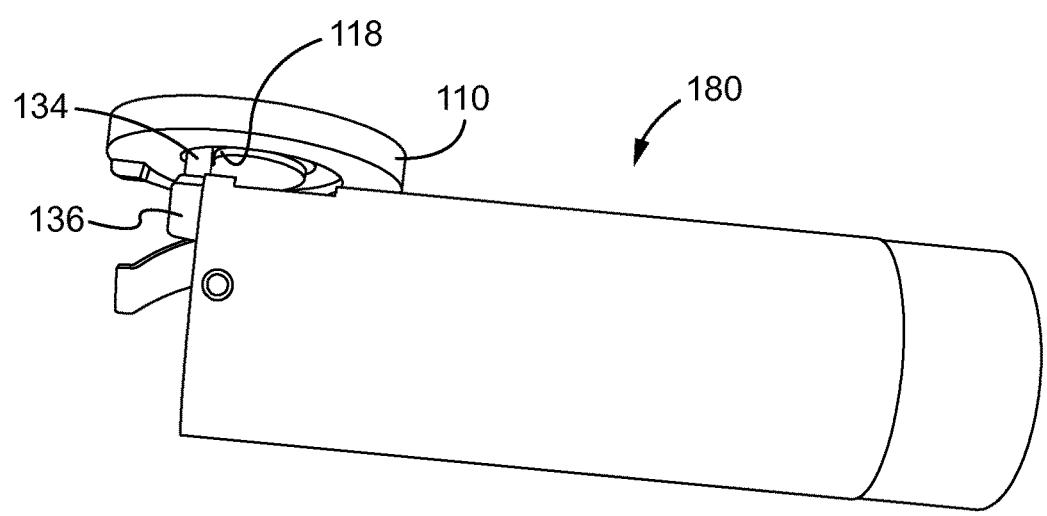
FIG. 6 is a perspective view of an example of a portion of a focus cam and an example mechanical displacement mechanism of the telescopic sight of FIG. 1A.

A displacement mechanism 136, such as an arm or rod, is operably connected to the moveable focus lens 126 (e.g., via a tube 138, or "lens carrier," housing the moveable lens, the tube 138 being moveable in a longitudinal direction in the housing 112, as shown in FIGS. 1, 5, and 6), and movement of the tracked arm or rod 136, such as along the arm or rod's axial direction, produces corresponding movement of the lens 126. The arm or rod 136 (also interchangeably referred to herein as a "linkage") may include an extending feature 134, such as a pin, extending generally in a direction perpendicular to the arm or rod's 136 axial direction (see, e.g., FIGS. 5 and 6). The extending feature 134 rides within the race or track 118 on the face of the focus cam 110.

As shown in FIG. 2, the first thumbwheel 104 may, for example, include a cylindrical portion 140 and a face portion 142, the face portion having a central opening 146 for receiving a shaft 156 of a sun gear (wheel gear) 158 and being positioned to close one end of the cylindrical portion 140. The cylindrical portion 140 may be sized to receive a portion of the focus cam 110, and the face portion 166 of the focus cam 110 may have recesses 168 for receiving one end of the axial shaft 172 of each of the pinion gears 174. The focus cam 110 may be receivable and slidably rotatable within the side focus housing 176, which is secured to the housing 112 of the telescoping sight 100. The ring gear 182 may also be receivable within the side focus housing 176 and be securable therewithin, such as by interference fit, or the use of one or more pins or screws, or other securing feature, such as an adhesive. In one example variation, as shown in FIGS. 2 and 3, also secured within the side focus housing 176 may be a ring gear having inwardly extending teeth. The ring gear, for example, may be further received within the interior of the cylindrical portion of the first thumbwheel 104 upon assembly.

Received within the ring gear 182 may be a sun gear (wheel gear) 158 and one or more planet gears (pinion gears) 174, comprising a planetary gear system. Each of the pinion or planet gears 174 may, for example be positionally secured to the focus cam 110, for example, via the second end of its axial shaft 156 being received within a corresponding opening 178 in the surface of the focus cam 110 opposite the surface having the race or track. In addition, the sun gear 158 interoperating with the planet or pinion gears 174, for example, may have an extending axial shaft 172 that extends through the opening in the face of the first thumbwheel 104, such that rotation of the sun gear 158 may occur via rotation of the second thumbwheel 106.

Rotation of the first thumbwheel 104 causes direct rotation of the focus cam 110 by virtue of rotation of the group of pinion gears 174 through their axial shafts 176. Rotation of the focus cam 110 causes the extending feature 134 of the arm or rod 136 to travel within the race or track 118 of the focus cam 110. The travel of the extending feature 136 of the arm or rod 136 causes the arm or rod 136 to travel in two linear directions, as the extending feature 134 travels within the curved track 118 with rotation of the focus cam 110. For example, the arm or rod 136 may be generally secured within the telescoping site, such that the arm or rod 136 is able to generally travel only along its axial direction (e.g., if the arm or rod 136 is contained within a slot, rings, or other mechanisms that allow only axial direction displacement). Thus, the motion of the arm or rod 136 due to the rotation of the focus cam 110 will produce generally only axial direction movement of the lens operably connected to the arm or rod, as a direct result of rotation of the first thumbwheel.

The second thumbwheel 106 may have a face 184 and may be secured via an opening 186 in the face 184 or otherwise to the shaft 156 extending from the sun gear 158 (e.g., via interference fit of the shaft 156 in the opening 186 in the face 184 of the second thumbwheel 106; or keyed feature of circumferential surface of shaft 156 matably engaging key receiving feature of opening 186 in face 184 of second thumbwheel 106, with the surface of the shaft 186 also mating with a nut 188). Thus, rotation of the second thumbwheel 106 may produce rotation of the sun gear 158, in turn producing rotation of the planet gears 174 that are teethably meshed with the sun gear 158, with rotation of the planet gears 174 thereby producing gear reduced rotation of the focus cam 110 via teethably meshing travel of the planet gears 174 about the inner teeth of the securably fixed ring gear 182. The rotation of the sun gear 158/thereby produces a reduced gear rotation of the focus cam 110 via the axial shafts 172 of the planet gears' 174 rotational travel with travel of the planet gears' 174 teeth within the fixed ring gear 182. As a result, the reduced gear rotation produces a fine control of the rotation of the focus cam 110, and thus fine control of movement of the arm or rod 136 in its axial direction via the spiral track 118 in the focus cam 110. Fine control of focus of the telescoping site results, via fine control of the motion of the lens operably coupled to the arm or rod.

Thus, the structural arrangement described above allows for both fine and course focus control. Accordingly, a method for focusing the telescoping sight may include operating the above-described structure, for example, via rotational motion of the course focus adjustment producing rotation of the spiral track; rotation of the spiral track causing movement of the moveable lens via travel of the feature of the cam mechanism receivable about the spiral track; and rotation of the fine focus adjustment control causing reduced gear ratio movement of the moveable lens via travel of the feature of the cam mechanism about the spiral track.

Additional advantages and novel features relating to aspects of the present invention will be set forth in part in the description that follows, and in part will become more apparent to those skilled in the art upon examination of the following or upon learning by practice thereof.

The invention claimed is:

1. A telescoping sight, comprising:
   a sight housing;
   a moveable lens within the sight housing;
   a course focus adjustment control being operable to move the moveable lens via a spiral track;
   a cam mechanism having a feature receivable within the spiral track; and
   a fine focus adjustment control, the fine focus adjustment control being interoperable with the spiral track;
   wherein the feature of the cam mechanism travels in the spiral track, and wherein motion of focus lens is produced via the travel of the cam mechanism in the spiral track, wherein the fine focus adjustment control is interoperable with the spiral track via a planetary gear system.

2. The telescoping sight of claim 1, wherein the course adjustment control comprises a first turnable knob.

3. The telescoping sight of claim 1, wherein the fine adjustment control comprises a second turnable knob.

4. The telescoping sight of claim 1, wherein the fine focus adjustment control is interoperable with the spiral track via a reduced gear ratio motion.

5. The telescoping sight of claim 1, wherein the spiral track has a spiral length, and wherein at least a portion of the spiral track throughout its spiral length falls within a single plane.

6. A method for focusing a telescoping sight, the telescoping sight including a sight housing; a moveable lens within the sight housing; a course focus adjustment control being operable to move the moveable lens via a spiral track; a cam mechanism having a feature receivable within the spiral track, and a fine focus adjustment control, the fine focus adjustment control being interoperable with the spiral track via a reduced gear feature, the method comprising:
   rotating the course focus adjustment to produce rotation of the spiral track;
   rotating the spiral track to cause movement of the moveable lens via travel of the feature of the cam mechanism receivable about the spiral track; and
   rotating the fine focus adjustment control to cause reduced gear ratio movement of the moveable lens via travel of the feature of the cam mechanism about the spiral track, wherein the fine focus adjustment control is interoperable with the spiral track via a planetary gear system.

7. The method of claim 6, wherein the course adjustment control comprises a first turnable knob.

8. The method of claim 6, wherein the fine adjustment control comprises a second turnable knob.

9. The method of claim 6, wherein the telescoping sight further comprises:
   a cam mechanism having a feature receivable within the spiral track, wherein the feature of the cam mechanism travels in the spiral track, and wherein motion of focus lens is produced via the travel of the cam mechanism in the spiral track.

10. The method of claim 9, wherein the fine focus adjustment control is interoperable with the spiral track via a reduced gear ratio motion.

11. The method of claim 6, wherein the spiral track has a spiral length, and wherein at least a portion of the spiral track throughout its spiral length falls within a single plane.

12. A control system for a telescoping sight, the telescoping sight having a sight housing a moveable lens within the sight housing, the control system comprising:
- a course focus adjustment control being operable to move the moveable lens via a spiral track;
- a cam mechanism having a feature receivable within the spiral track, wherein the feature of the cam mechanism travels in the spiral track; and
- a fine focus adjustment control, the fine focus adjustment control being interoperable with the spiral track via a reduced gear ratio mechanism, wherein the reduced gear ratio mechanism comprises a planetary gear system; and
- wherein motion of focus lens is produced via the travel of the cam mechanism in the spiral track.

13. The system of claim 12, wherein the spiral track has a spiral length, and wherein at least a portion of the spiral track throughout its spiral length falls within a single plane.

* * * * *